(12) United States Patent
Ichihara et al.

(10) Patent No.: US 10,109,206 B2
(45) Date of Patent: Oct. 23, 2018

(54) FLIGHT CONTROL APPARATUS AND UNMANNED AERIAL VEHICLE EQUIPPED WITH SAME

(71) Applicant: PRODRONE CO., LTD., Nagoya-shi, Aichi (JP)

(72) Inventors: Kazuo Ichihara, Nagoya (JP); Kiyokazu Sugaki, Nagoya (JP)

(73) Assignee: PRODRONE CO., LTD., Nagoya-shi (JP)

( * ) Notice: Subject to any disclaimer, the term of this patent is extended or adjusted under 35 U.S.C. 154(b) by 0 days.

(21) Appl. No.: 15/749,481

(22) PCT Filed: Aug. 3, 2016

(86) PCT No.: PCT/JP2016/072750
§ 371 (c)(1),
(2) Date: Jan. 31, 2018

(87) PCT Pub. No.: WO2017/026337
PCT Pub. Date: Feb. 16, 2017

(65) Prior Publication Data
US 2018/0225977 A1    Aug. 9, 2018

(30) Foreign Application Priority Data

Aug. 7, 2015 (JP) ................. 2015-157720
Nov. 18, 2015 (JP) ................. 2015-225922

(51) Int. Cl.
*G08G 5/00* (2006.01)
*B64C 39/02* (2006.01)
(Continued)

(52) U.S. Cl.
CPC ........... *G08G 5/006* (2013.01); *B64C 39/028* (2013.01); *G05D 1/0615* (2013.01);
(Continued)

(58) Field of Classification Search
CPC .... G08G 5/006; G08G 5/0069; G08G 5/0039; G05D 1/0676; G05D 1/0615; B64C 39/028; B64C 27/08
See application file for complete search history.

(56) References Cited

U.S. PATENT DOCUMENTS 9,773,418 B1 *  9/2017  Smith ................. G08G 5/0043
9,821,910 B1 * 11/2017  Suiter ................... B64C 39/024
(Continued)

FOREIGN PATENT DOCUMENTS

JP    S48-45400 U    6/1973
JP    S64-2559 B2    1/1989
(Continued)

OTHER PUBLICATIONS

Nov. 1, 2016 International Search Report issued in International Patent Application No. PCT/JP2016/072750.

*Primary Examiner* — Russell Frejd
(74) *Attorney, Agent, or Firm* — Oliff PLC

(57) ABSTRACT

A flight control apparatus that prevents an unmanned aerial vehicle from deviating from a predetermined flight-permitted area and is able to forcibly restrain it even when abnormality is present in the flight environment and the operation of the respective mechanisms of the vehicle, and an unmanned aerial vehicle equipped with this apparatus. The apparatus includes current position acquiring means for acquiring a flight position of the vehicle, flight-permitted area storing means, and deviation preventing means, wherein it forcibly makes the body unable to fly when: the current position acquiring means has become unable to acquire the position of the body, the flight position of the body is in the vicinity of the boundaries between the flight-permitted area and space external thereto or keeps out of the flight-permitted area for a predetermined time or longer, or the body has moved away a predetermined distance or more from the flight-permitted area.

11 Claims, 5 Drawing Sheets

(51) Int. Cl.
*G05D 1/06* (2006.01)
*B64C 27/08* (2006.01)

(52) U.S. Cl.
CPC ......... *G05D 1/0676* (2013.01); *G08G 5/0069* (2013.01); *B64C 27/08* (2013.01); *G08G 5/0039* (2013.01)

(56) References Cited

U.S. PATENT DOCUMENTS

| | | | |
|---|---|---|---|
| 2002/0161514 | A1 | 10/2002 | Shinagawa |
| 2013/0060405 | A1 | 3/2013 | Komatsuzaki et al. |
| 2017/0004662 | A1* | 1/2017 | Gong ........................ B64C 9/00 |
| 2017/0268247 | A1* | 9/2017 | Madincea ................. E04H 3/10 |
| 2018/0018881 | A1* | 1/2018 | Cui ........................ G08G 5/006 |
| 2018/0081355 | A1* | 3/2018 | Magy ..................... F41H 13/00 |

FOREIGN PATENT DOCUMENTS

| | | |
|---|---|---|
| JP | 2002-274495 A | 9/2002 |
| JP | 2003-127994 A | 5/2003 |
| JP | 2006-064550 A | 3/2006 |
| JP | 2007-237873 A | 9/2007 |
| JP | 5573949 B2 | 8/2014 |
| JP | 2014-227166 A | 12/2014 |
| JP | 2015-014500 A | 1/2015 |
| WO | 2003/004352 A1 | 1/2003 |
| WO | 2014/108026 A1 | 7/2014 |

* cited by examiner

FLIGHT CONTROL APPARATUS AND UNMANNED AERIAL VEHICLE EQUIPPED WITH SAME

TECHNICAL FIELD

The present invention relates to a flight control apparatus and an unmanned aerial vehicle equipped with the same, and more particularly, to a technology for preventing an unmanned aerial vehicle from deviating from a predetermined flight-permitted area.

BACKGROUND ART

Conventionally, miniature unmanned aerial vehicles (UAVs) which are typified by unmanned helicopters for industrial use have been expensive and hard to obtain and manipulative skills have been needed to make them fly stably. Recently, however, the performance of body mounted components such as an acceleration sensor and an angular velocity sensor has been enhanced and their prices have decreased, as well as UAV maneuverability has improved dramatically because many operations to control and manipulate the body have been automated. With background circumstances as above, attempts are now made to apply, especially, miniature multicopters to diverse missions in a wide range of fields, not only for hobby purposes.

A technology is known that defines virtual boundaries of a given geographical region, detects that a moving body has entered and left this region, and notifies a person involved of the entry. An example of actual use of such a technology is, inter alia, so-called Geofence. Also, for a multicopter, in order to prevent the multicopter from entering a no-admittance area when it is piloted manually or it flies autonomously, the multicopter flight area may be restricted using a scheme like the above technology in some situations.

CITATION LIST

Patent Literature

PTL1: Japanese Patent No. 5573949
PTL2: JP 2015-014500 A
PTL3: JP 2006-064550 A
PTL4: JP 2002-274495 A

SUMMARY OF INVENTION

Technical Problem

It is theoretically possible to restrict the multicopter flight area to desired bounds by applying technical approaches described in the Patent Literatures listed above and the Geofence scheme, among others. However, it just works only when the multicopter's flight environment and operation of its respective mechanisms are normal, and it cannot restrain the multicopter in an abnormal state from flying out of the flight area, for example, in a case where the multicopter has become unable to detect its flight position, where the multicopter is continuously blown by a wind stronger than its thrust, where some of propellers have failed, or where communication with the manipulator has been interrupted for a long time when the multicopter is piloted manually.

In consideration of the problem noted above, a problem to be solved by the present invention resides in providing a flight control apparatus that prevents an unmanned aerial vehicle from deviating from a predetermined flight-permitted area, and moreover, is able to forcibly restrain the unmanned aerial vehicle from deviating from the flight-permitted area even in a case where abnormality is present in the flight environment and the operation of the respective mechanisms of the unmanned aerial vehicle and an unmanned aerial vehicle equipped with this apparatus.

Solution to Problem

To solve the foregoing problem, a flight control apparatus of the present invention includes flight control means for controlling attitude and flying operations of a body when an unmanned aerial vehicle is in a normal flight state, current position acquiring means for acquiring a flight position of the body in the air, flight area storing means in which information that delimits a flight area which is a space in which the body is permitted to fly is registered, and deviation preventing means for preventing the body from deviating from the flight area, wherein the deviation preventing means forcibly makes the body unable to fly, based on predefined conditions. In this regard, it is preferable that the deviation preventing means forcibly causes the body to land or fall, based on predefined conditions. Furthermore, it is preferable that the deviation preventing means forcibly causes the body to land or fall when the current position acquiring means has become unable to acquire the flight position of the body or when the flight position of the body acquired by the current position acquiring means is in the vicinity of the boundaries between the flight area and space external thereto or out of the flight area.

By equipping an unmanned aerial vehicle with the above deviation preventing means, the body is forcibly placed in a flight disabled state even when an indication that the unmanned aerial vehicle will fly out of the flight area has been detected, e.g., because of failure of body-mounted parts of the unmanned aerial vehicle or an environmental effect such as a strong wind; therefore, an accident in a place away from the flight area can be obviated. Thereby, damage in the worst scenario when abnormality occurs can be confined to economic loss, i.e., loss or damage of the unmanned aerial vehicle and a risk of an accident caused by the unmanned aerial vehicle can be put under control.

It is also preferable that, depending on time during which the current position acquiring means continuously fails to acquire the flight position of the body, a relative positional relation between the boundaries of the flight area and the body, or continuous flight time of the body when in the positional relation, the deviation preventing means is capable of stepwise execution of deviation preventing manipulations of the body including at least (4) or (5) of deviation preventing manipulations as follows: (1) alerting a manipulator of the body; (2) a manipulation of pulling the body back to the flight area; (3) hovering or a circular flight of the body; (4) a landing manipulation of the body; and (5) a fall manipulation of the body.

Depending on the degree of deviation of the unmanned aerial vehicle from the flight area, the deviation preventing means causes the unmanned aerial vehicle to enter a flight disabled state in a stepwise manner. Even in a case where abnormality has been found in the flight route of the unmanned aerial vehicle, if the abnormality is not severe, the vehicle is allowed to continue to fly, correcting its flight position automatically. Only if the vehicle has been placed in a situation where it is impossible to correct its flight position, it is possible to place the unmanned aerial vehicle in the flight disabled state. Thereby, it would become possible to cope with abnormality of the unmanned aerial vehicle more flexibly.

In addition, the flight control apparatus may be configured such that it further includes a main control device and a sub-control device which are separate entities, the main control device includes the flight control means, the sub-control device includes the flight area storing means and the deviation preventing means, and the sub-control device can interrupt a body control processing by the main control device.

The flight control apparatus is equipped with the sub-control device dedicated to execution of the deviation preventing means, separately from the main control device which controls flying operations of the unmanned aerial vehicle when in a normal flight state; therefore, even if the main control device hangs up, e.g., because the main control device thermally runs away due to overload or for other reason, the sub-control device having a low load during the normal flight state can cause the body to enter the flight-disabled state reliably.

In addition, it is preferable to configure the flight control apparatus such that the main control device includes a central processing unit and a pulse width modulator, the central processing unit and the pulse width modulator are connected via the sub-control device, and the sub-control device allows a control signal from the central processing unit to the pulse width modulator to pass therethrough when the body is in a normal flight state, and shuts off a control signal from the central processing unit and sends a control signal directly to the pulse width modulator when interrupting the body control processing by the main control device.

As for a flight control apparatus equipped with a pulse width modulator, a protocol for communication between the central processing unit and the pulse width modulator is generally congruent for any kind of flight control apparatus which is available commercially. Hence, by configuring the flight control apparatus as above, it is possible to manufacture, at low cost and in a short period, the flight control apparatus equipped with the deviation preventing means of the present invention using a flight control apparatus, which is widely and generally distributed. Moreover, an operating instruction that should be avoided normally, such as an operating instruction that results in a fall of the body, may not be accepted via access means prepared in advance in a commercially available flight control apparatus, because a safety mechanism is activated. Then, by sending a control signal from the deviation preventing means directly to the pulse width modulator without passing it through the central processing unit of the flight control apparatus, all controls including, inter alia, the abovementioned fall manipulation of the aircraft would become possible.

Also, it is preferable that the flight control apparatus further includes runaway detecting means which is a circuit to shut off an unjust interruption by the sub-control device, wherein the sub-control device cannot interrupt the body control processing by the main control device unless after executing predefined processing to the runaway detecting means.

Particularly, it is preferable that the runaway detecting means includes a sequential circuit and the sub-control device is allowed to interrupt the body control processing by the main control device by operating the sequential circuit in a predetermined sequence and at predetermined timing.

Execution of the deviation preventing means by the sub-control device has a significant effect on flying operations of the unmanned aerial vehicle such as invalidation of the body control by the main control device and a fall of the body. Hence, it is necessary to prevent that the body control by the main control device is unjustly deprived due to runaway of the sub-control device. By making a configuration such that the flight control apparatus is equipped with the runaway detecting means and the sub-control device is disabled to interrupt the control processing by the main control device when the sub-control device is unable to operate properly, it is possible to prevent unintended execution of the deviation preventing means due to runaway of the sub-control device.

Also, it is preferable that the main control device and the sub-control device include separate ones of the current position acquiring means, respectively, and are connected to separate sources of power supply.

If the main control device and the sub-control device use a common source of power supply, a fall of the body is inevitable when the source of power supply stops. If the main control device and the sub-control device share the current position acquiring means, it is hard to detect abnormality occurring in the current position acquiring means. By equipping the main control device and the sub-control device with separate sources of power supply and separate ones of the current position acquiring means, it is possible to improve the reliability of the deviation preventing means against failure of respective components.

Also, it is preferable that the deviation preventing means causes a parachute to be ejected from the body when forcibly causing the body to fall.

By making the parachute spread when causing the unmanned aerial vehicle to fall, it is possible to reduce damage to the body as well as a structure or the like in and around the landing point.

Also, it is preferable that the parachute suspends the body being tilted approximately 90 degrees in a vertical direction from a hovering attitude of the body.

For instance, when the unmanned aerial vehicle supports expensive equipment in its bottom part, the body of the unmanned aerial vehicle is to serve as a cushion upon its fall, so that damage to the equipment can be reduced.

In addition, a configuration may be such that the deviation preventing means electrically or mechanically breaks a signal line or a power line which is constituent of a lift generating device of the body or physically separates at least a part of the lift generating device from the body when forcibly causing the body to fall.

In a case where abnormality is found in the flight route of the unmanned aerial vehicle and the vehicle has been placed in a situation where it is impossible to correct its flight position, electric control of the body will not necessarily function properly. By making a configuration such that a part of the body is broken physically and generation of lift is inevitably stopped, when the unmanned aerial vehicle is caused to fall by the deviation preventing means, it would become possible to cause the body to fall reliably.

To solve the foregoing problem, an unmanned aerial vehicle of the present invention includes the flight control apparatus of the present invention and a plurality of rotors including a plurality of DC motors and rotary wings installed on respective output shafts of the DC motors.

The flight control apparatus of the present invention is suitable for application to a multicopter which is an unmanned aerial vehicle.

Also, it is preferable that, when the body has descended to a predetermined altitude of 3 m or below from the ground, the deviation preventing means stops rotation of the plurality of rotors to cause the body to fall when forcibly causing the body to land.

When landing the multicopter, the descending speed for its landing should be reduced as much as possible. Meanwhile, the rotary wings of the multicopter are sharp and, for example, in a case where a structure or the like exists in and around the landing point of the body, the rotary wings may severely damage the structure. Also, assuming a case where a pedestrian is present in and around the landing point, it is necessary to take countermeasures to minimize damage. When landing the multicopter, by reducing the descending speed as much as possible, close to coming to an altitude corresponding to the stature of a person, then stopping the rotary wings to cause the body to fall, it would become possible to provide compatibility between landing and prevention of possible damage.

In addition, a configuration may be such that the deviation preventing means first separates the rotor positioned in the rear of the body with respect to its flying direction and separates the other rotors after a given period of time, when forcibly causing the body to fall.

By first separating a rotary wing positioned in the rear of the multicopter with respect to its flying direction, the body is put in a state where a brake has been applied to it temporarily, so that the distance of deviation of the multicopter out of the flight area can be shortened.

Advantageous Effects of Invention

According to the flight control apparatus and the unmanned aerial vehicle equipped with same pertaining to the present invention, the unmanned aerial vehicle can be prevented from deviating from a predetermined flight-permitted area, and moreover, it is possible to forcibly restrain the unmanned aerial vehicle from deviating from the flight-permitted area even in a case where abnormality is present in the flight environment and the operation of the respective mechanisms of the unmanned aerial vehicle.

DESCRIPTION OF EMBODIMENTS

In the following, with the aid of the drawings, descriptions are provided about embodiments of a flight control apparatus and an unmanned aerial vehicle equipped with the same pertaining to the present invention.

First Embodiment

[Configuration Overview]

Figure 1:
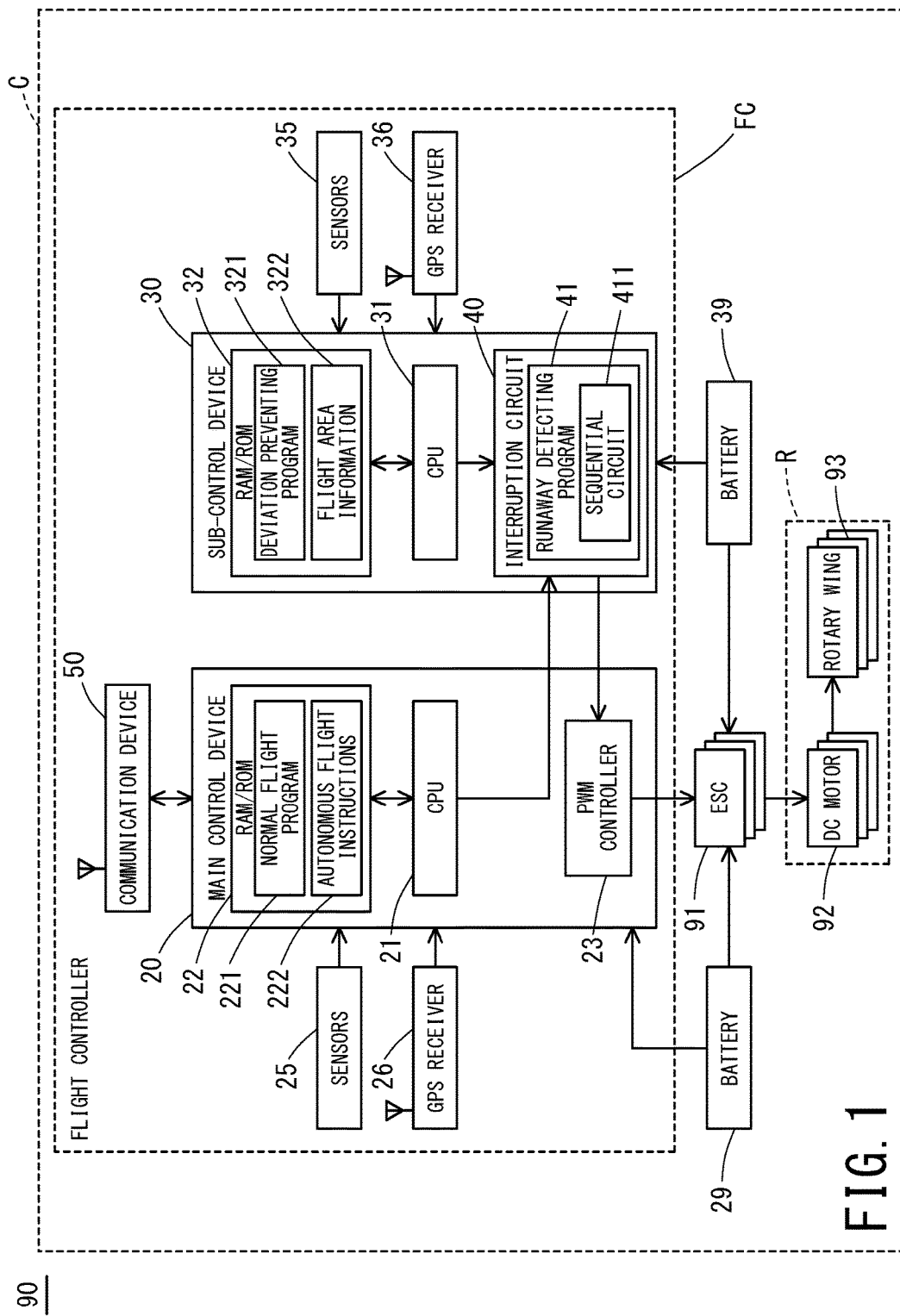
FIG. 1 is a block diagram depicting a general configuration of a multicopter pertaining to a first embodiment.

FIG. 1 is a block diagram depicting a functional configuration of a multicopter 90 (an unmanned aerial vehicle) pertaining to the present embodiment. The multicopter 90 is comprised of its housing C, a flight controller FC (a flight control apparatus) installed in the housing C, a plurality of rotors R, an ESC 91 (Electric Speed Controller) (motor controller) provided for each rotor R, and batteries 29, 39 which are power supply sources. Each rotor R is comprised of a DC motor 92 and a blade 93 (a rotary wing) installed on the motor output shaft. The ESC 91 is connected to the DC motor 92 of the rotor R and is a device that rotates the DC motor 92 at a speed commanded from the flight controller FC.

The flight controller FC is equipped with a main control device 20 which controls attitude and flying operations of the multicopter 90 when in a normal flight state and a sub-control device 30 which is a separate entity from the main control device 20. Both the main control device 20 and the sub-control device 30 are microcontrollers, each including a CPU 21, 31 which is a central processing unit and a RAM/ROM 22, 32 which is a storage device. Now, the wording "when in a normal flight state" in the present invention means a state when a deviation preventing manipulation for the body by a deviation preventing program 321 which will be described is not executed.

The main control device 20 and the sub-control device 30 are respectively equipped with separate batteries 29, 39, suites of sensors 25, 35, and GPS receivers 26, 36. In each of the suites of sensors 25, 35, an acceleration sensor, an angular velocity sensor, an atmospheric pressure sensor (an altitude sensor), and a geomagnetic sensor (a direction sensor) are included. Through these suites of sensors 25, 35 and GPS receivers (26, 36) (hereinafter also referred to as "sensors and other equipment") (current position acquiring means), the main control device 20 and the sub-control device 30 are adapted to be able to acquire a current position including latitude/longitude and altitude of the body during a flight of the multicopter 90 respectively and independently.

If the main control device 20 and the sub-control device 30 use a common battery, a fall of the multicopter 90 cannot be avoided when the battery fails. Also, if the main control device 20 and the sub-control device 30 share sensors and other equipment, it is hard to detect that abnormality occurs in the sensors and other equipment. The flight controller FC in the present embodiment has enhanced reliability against failure of components because the main control device 20 and the sub-control device 30 are respectively equipped with separate batteries 29, 39, suites of sensors 25, 35 and GPS receivers 26, 36.

Now, although the multicopter 90 in the present embodiment uses the suites of sensors 25, 35 and GPS receivers 26, 36 as the current position acquiring means, the current position acquiring means in the present invention is not limited to these. The current position of the multicopter 90 may be located by, for example, installing beacons compliant with a proximity profile of Bluetooth (a registered trademark) Low Energy at given intervals in a large-scale plant building and measuring relative distances to these beacons. Additionally, although the multicopter 90 in the present embodiment is assumed to acquire its flight altitude through an atmospheric pressure sensor, it is also possible to acquire the altitude by orienting a distance measurement sensor using any of various methods such as, e.g., infrared, ultrasonic, or laser toward the ground, in addition to the atmospheric pressure sensor. Moreover, an approximate current position of the multicopter may be located by scanning the surroundings of the multicopter with such a distance measurement sensor, thus detecting geographical features (or detecting geographical features by image recognition from images of the surroundings of the multicopter captured by a camera) and matching the geographical features against preregistered information on geographical features along a flight route.

In the RAM/ROM 22 of the main control device 20, a normal flight program 221 which is flight control means for the multicopter 90 when in a normal flight state is stored. According to a command given by a manipulator, the normal flight program 221 causes the multicopter 90 to fly, while adjusting the rotating speed of the respective rotors R and compensating the body attitude and positional misalignment, based on the current position acquired from the sensors and other equipment. Piloting the multicopter 90 may be performed manually by the manipulator via a communication device 50. Alternatively, with parameters such as latitude/longitude, a flight route, flight altitude, and flight speed which should be preregistered as autonomous flight instructions 222 in the normal flight program 221, the multicopter may be caused to fly autonomously toward a destination.

[Body Control Interruption Structure]

Figure 2:
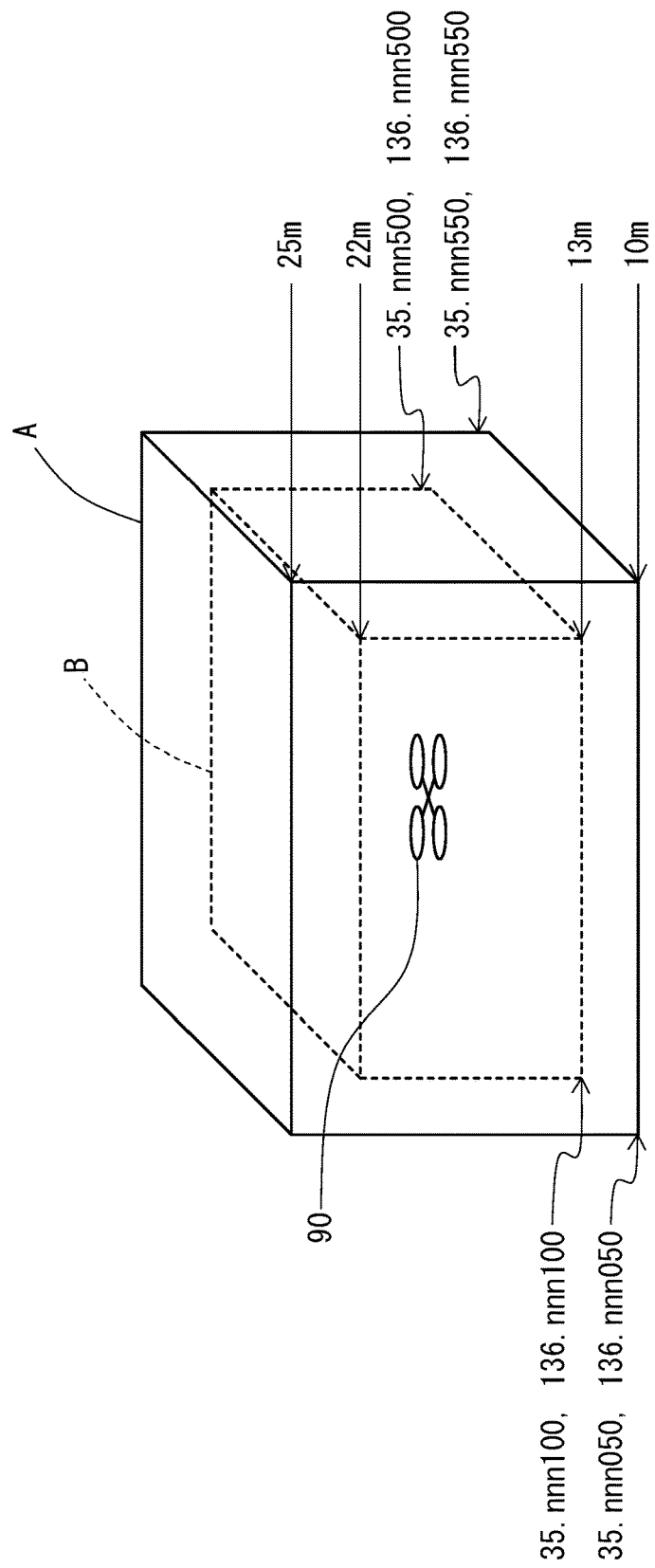
FIG. 2 is a diagram depicting one example of a flight area registered in the RAM/ROM of a sub-control device.

In the RAM/ROM 32 (flight area storing means) of the sub-control device 30, flight area information 322 is registered which is information that delimits a flight area A which is a space in which the multicopter 90 is permitted to fly. "Information that delimits a flight area A" in the present embodiment is, specifically, minimum and maximum values of latitude/longitude and minimum and maximum values of altitude of the flight area A. In such information, also included are minimum and maximum values of latitude/longitude and minimum and maximum values of altitude that delimit a vicinity of boundaries B between the flight area A and space external thereto, which will be described later. Now, the forms of the flight area and the vicinity B of the boundaries are not limited to simple cubic forms like those which are depicted in FIG. 2. These forms may be any form of space whose confines can be determined by values corresponding to latitude/longitude and altitude. In the RAM/ROM 32, a deviation preventing program 321 is also stored which is a program for preventing the multicopter 90 from deviating from the flight area A.

Since the multicopter 90 is equipped with the sub-control device 30 dedicated to execution of the deviation preventing program 321, separately from the main control device 20 which controls the body during its normal flight state, even in a case where the main control device 20 fails to function during a flight of the multicopter 90, for example, because the main control device 20 thermally runs away due to overload, the normal flight program 221 hangs up due to bugs that are hard to detect, or for other reason, the sub-control device 30 having low throughput during a normal flight state takes on a key role of executing the deviation preventing program 321; therefore, it is possible to execute the deviation preventing program 321 more reliably.

The main control device 20 includes a PWM controller 23 (a pulse width modulator), and the CPU 21 of the main control device 20 and the PWM controller 23 are connected via an interruption circuit 40 in the sub-control device 30. The interruption circuit 40 in the present embodiment is configured with a one-chip microcomputer. To input ports of the interruption circuit 40, a PWM signal line of the CPU 21 or a signal line which transmits information required to generate a PWM signal (hereinafter, such a signal line is generically called a "control line" and a PWM signal and information re qui red to generate it are generically called a "control signal") and a control line of the CPU 31 of the sub-control device 30 are connected. To an output port of the interruption circuit 40, the PWM controller 23 is connected; this enables the CPU 21 of the main control device 20 to transmit a control signal to the PWM controller 23 via the interruption circuit 40. Implementation of the interruption circuit 40 is not limited to a one-chip microcomputer in the present embodiment; the interruption circuit 40 is at least required to provide a mechanism that can dynamically switch over an input signal transmission path based on predefined conditions, no matter how it is implemented. In addition, if a signal that is input to the interruption circuit 40 is not a PWM signal but information required to generate it, a PWM signal generating unit which generates a PWM signal from such information may be provided between the interruption circuit 40 and the PWM controller 23.

When the multicopter 90 is in a normal flight state, the interruption circuit 40 transfers a control signal from the CPU 21 to the PWM controller 23. When the body is controlled by the deviation preventing program 321, then the interruption circuit 40 shuts off a control signal from the CPU 21 and sends a control signal from the deviation preventing program 321 (the CPU 31) to the PWM controller 23. Such a switchover of the transmission path is performed by a program with which the interruption circuit 40 is provided. "Interruption by the sub-control device" in the present invention means that the sub-control device shuts off a control signal from the main control device and sends a control signal based on the deviation preventing means to the PWM controller, as described above.

A protocol for communication between the CPU of the flight controller and the PWM controller is generally congruent for most flight controllers which are available commercially. Hence, it is possible to manufacture a flight controller equipped with the deviation preventing means of the present invention using a flight controller that is widely and generally distributed at low cost and in a short period by diverting the communication between the CPU and the PWM controller to the separate sub-control device and allowing such communication to be handled by the sub-control device.

Moreover, in a case where a general flight controller is used, an instruction that could be judged as an unjust or erroneous operation by the flight controller, such as an operating instruction that results in a fall of the body, may not be accepted via access means prepared in advance in the flight controller because a safety mechanism is activated. In the present embodiment, by implementing a contrivance that sends a control signal from the deviation preventing program 321 directly to the PWM controller 23 without passing via the CPU 21 of the main control device 20, it is possible to execute all body control manipulations including manipulating the multicopter 90 to fall without being blocked by a safety mechanism.

[Deviation Preventing Manipulations]

FIG. 2 is a diagram depicting one example of a flight area A registered in the RAM/ROM 32 of the sub-control device 30. Of cubic shaped confined spaces, displayed transparently, an outer confined space displayed with solid lines is a flight area A. The flight area A is defined by latitude and longitude ranges of [35. nnn050, 136. nnn050] to [35. nnn550, 136. nnn550] in decimal notation and an altitude range of 10 m to 25 m. A confined space displayed with dotted lines inside the flight area A is the confined space that denotes the vicinity B of the boundaries between the fight area A and space external thereto. The vicinity B of the boundaries is defined by latitude and longitude ranges of [35. nnn100, 136. nnn100] to [35. nnn500, 136. nnn500] and an altitude range of 13 m to 22 m. Note that "nnn" used in latitude and longitude values denotes an arbitrary value and "nnn" included in maximum and minimum values of latitude and "nnn" included in maximum and minimum values of longitude are identical values.

Figure 3:
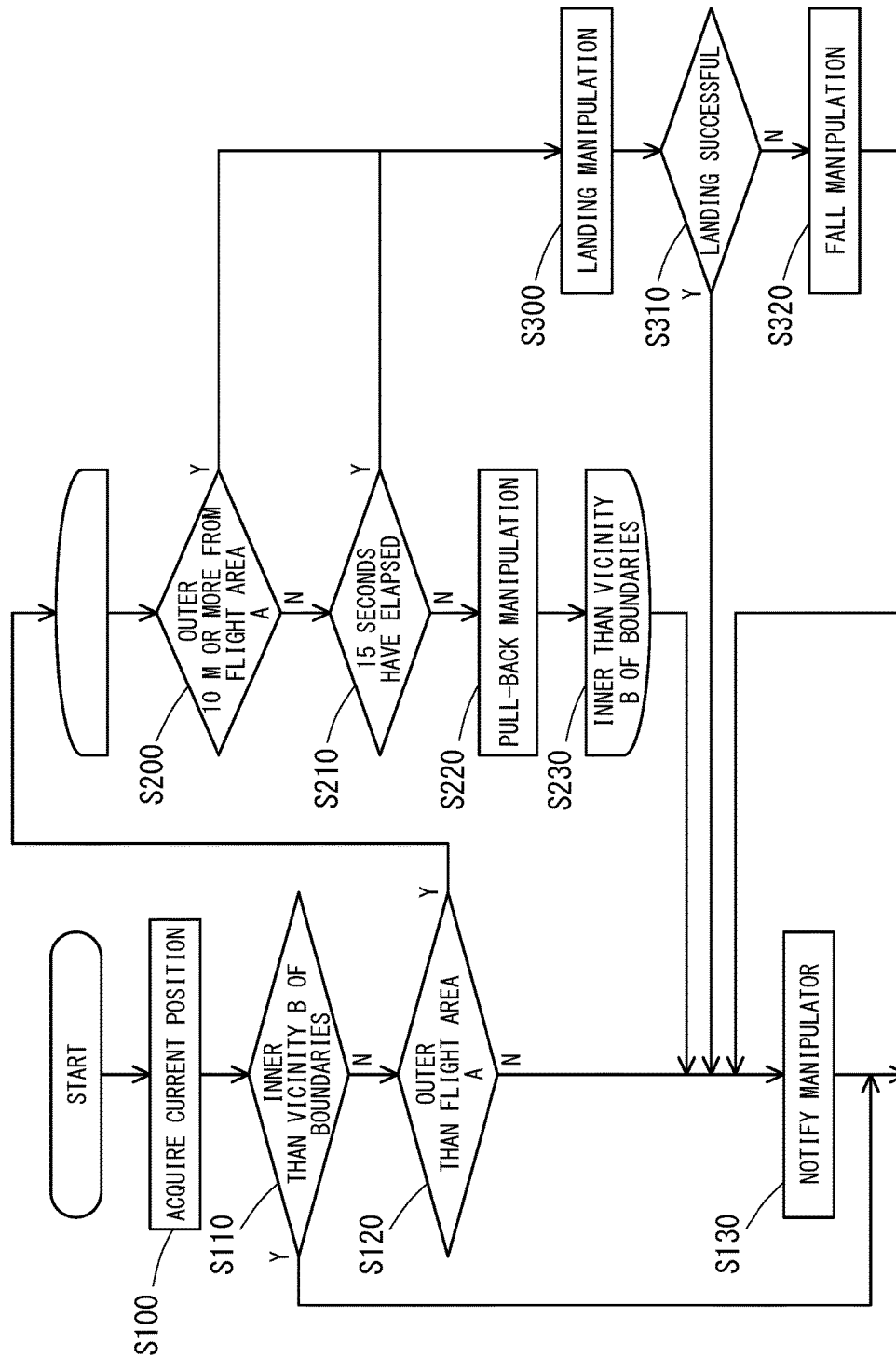
FIG. 3 is a flowchart illustrating deviation preventing manipulations by the deviation preventing means in the first embodiment.

FIG. 3 is a flowchart illustrating conditions for execution of deviation preventing manipulations by the deviation preventing program 321. The flight controller FC executes the deviation preventing program 321 periodically. The sub-control device 30 in the present embodiment acquires a flight position (hereinafter also referred to as the current position) of the multicopter 90 in the air, using the suite of sensors 35 and the GPS receiver 36 (S100).

When the current position acquired at S100 is inner than the vicinity B of the boundaries, the process terminates, as no abnormality is present (S110: Y). When the current position is outer than the vicinity B of the boundaries (S110: N) but falling within the flight area A (S120: N), the deviation preventing program 321 notifies the manipulator of that event via the communication device 50 ((1) alerting the body manipulator) (S130) and the process executed this time terminates.

When the current position is outer than the flight area A (S120: Y) but at a distance less than 10 m from the flight area (S200: N), the deviation preventing program 321 attempts a pull-back manipulation of the multicopter 90 ((2) a manipulation of pulling the body back to the flight area) (S220). Now, the "pull-back manipulation" is a manipulation in which the deviation preventing program 321 causes the multicopter 90 to return to a position inner than the vicinity B of the boundaries of the flight area A while monitoring the current position, using the suite of sensors 35 and the GPS receiver 36 of the sub-control device 30. For this purpose, the sub-control device 30 has to be provided with at least an autonomous fight function that becomes necessary for the pull-back manipulation of the multicopter 90 among the functions of the normal flight program 221. Here, for example, in an instance in which piloting signals are continuously transmitted from the manipulator to the communication device 50, a branch condition may be added in which the sub-control device 30 leaves a return operation to the manipulator without interrupting the control processing by the main control device 20.

If the multicopter 90 returns to a position inner than the vicinity B of the boundaries by the pull-back manipulation B (S230: Y), the deviation preventing program 321 notifies the manipulator of that event (S130) and the process executed this time terminates.

When the multicopter 90 has moved 10 m or more from the flight area A (S200: Y) or if the multicopter 90 cannot return to within the vicinity B of the boundaries even by the pull-back manipulation executed for 15 seconds or more (S210: Y), the deviation preventing program 321 attempts a landing manipulation of the multicopter 90 ((4) a landing manipulation of the body) (S300). If the landing manipulation is successful (S310: Y), the deviation preventing program 321 notifies the manipulator of that event (S130) and the process terminates.

The "landing manipulation" in the present invention is causing the multicopter to descend gradually down to the ground; i.e., the deviation preventing program 321 in the present embodiment causes the body to hover once when the multicopter 90 has descended to an altitude of 3 m from the ground to reduce the descending speed and, then, stops rotation of the rotors R to cause the body to fall. When landing the multicopter 90, the descending speed for its landing should be reduced as much as possible. Meanwhile, the blades 93 of the multicopter 90 are sharp, and for example, in a case where a structure or the like exists in and around the landing point of the multicopter 90, the blades 93 may damage the structure. Also, assuming an unexpected case where a pedestrian is present in and around the landing point (usually, a flight route is set to land at a place where no pedestrian is present), it is necessary to take countermeasures to minimize damage in such a case. The deviation preventing pro gram 321 in the present embodiment reduces the descending speed as much as possible at a certain altitude (3 m) before approximating a height corresponding to the stature of a person, when landing the multicopter 90, and then stops the blades 93 to cause the body to fall, thus providing compatibility between landing and prevention of possible damage. Now, with a distance measurement sensor using any of various methods such as, e.g., infrared, ultrasonic, or laser, by scanning for presence of an obstacle vertically under the body, if it can be made certain that the multicopter is to land at a flat place where neither obstacle nor pedestrian is present, the multicopter may be caused to land without stopping the rotors R.

When the landing manipulation is unsuccessful (S310: N), the deviation preventing program 321 performs a fall manipulation ((5) a fall manipulation of the body) (S320) and, at the same time, notifies the manipulator of that event (S130). Now, the "fall manipulation" is a manipulation of stopping all the rotors R to cause the body to fall to the ground surface. Here, it is preferable to equip the multicopter 90 with a mechanism to moderate the descending speed of the body, such as, e.g., a parachute ejection device, which is not illustrated, and make a configuration to spread the parachute when the fall manipulation is performed.

In this way, it is possible to forcibly restrain the body from leaving the flight area A by alerting the manipulator of the multicopter 90 and controlling the multicopter 90 to pull it back to within the flight area A, and in addition, by landing the body, and furthermore, causing the body to fall depending on how far the multicopter deviates from the area. Even when an indication that the multicopter 90 will fly out of the flight area A has been detected, e.g., because of failure of body-mounted parts of the multicopter 90 or an environmental effect such as strong wind, the body is forcibly made to enter a flight disabled state by the landing or fall manipulation described above; therefore, an accident in a place away from the flight area A can be obviated. Thereby, damage in the worst scenario when abnormality occurs can be confined to economic loss, i.e., loss or damage of the multicopter 90 and a risk of an accident caused by the multicopter 90 can be put under control. Now, the conditions for execution of each of the deviation preventing manipulations, as illustrated in FIG. 3, are exemplary and a suitable condition for executing each deviation preventing manipulation can be set appropriately.

[Runaway Preventing Mechanism]

As described above, the sub-control device 30 interrupts a control processing of the multicopter 90 by the main control device 20 and executes the deviation preventing program 321.

The interruption circuit 40 is further provided with a runaway detecting program 41 (runaway detecting means) which is a circuit to shut off an unjust interruption by the sub-control device 30. The sub-control device 30 cannot interrupt the control processing of the multicopter 90 unless after executing predefined processing to the runaway detecting program 41.

Specifically, the runaway detecting program 41 is provided with a sequential circuit 411 including flip-flop circuits and the sub-control device 30 is allowed to interrupt the control processing of the multicopter 90 by switching over the outputs of the sequential circuit 411 in a predetermined sequence and at predetermined timing.

One example of implementation hereof is described below. Two control lines are provided between the CPU 31 of the sub-control device 30 and the interruption circuit 40. Signals carried by these two control lines are also input to the sequential circuit 411. Normally, both these control lines remain in an L state (in which the signal voltage is 0 V). When the sub-control device 30 attempts to make an interruption, the CPU 31 first turns a first control line to an H state (in which the signal voltage is equal to the power supply voltage). Triggered by this, the runaway detecting program 41 activates an internal timer and starts counting. Then, the CPU 31 turns a second control line to the H state at 50 msec. after turning the first control line to the H state. Upon detecting that the second control line has changed to the H state, the runaway detecting program 41 makes certain that the count of the internal timer falls in a range from 40 msec. to 60 msec. at this point of time and transits into a preparation phase for permitting an interruption and, at the same time, resets the internal time and restarts counting. Then, the CPU 31 returns the first control line to the L state at 100 ms. after turning the second control line to the H state. Upon detecting that the first control line has changed to the L state, the runaway detecting program 41 makes certain that the count of the internal timer restarted falls in a range from 90 msec. to 110 msec. When no error occurs in the procedure up to this stage, the runaway detecting program 41 determines that abnormality is not present in operation of the sub-control device 30 and permits an interruption by the sub-control device 30 (the deviation preventing program 321). After that, a control signal from the deviation preventing program 321 is input to the interruption circuit 40 through the use of the second control line. When the deviation preventing program 321 has completed a series of deviation preventing manipulations, the first control line changes to the H state once and then returns to the L state. Cued by this, the interruption circuit 40 detects the completion of the deviation preventing manipulations and shuts off an interruption by the sub-control device 30 and, at the same time, restarts transfer of a control signal from the main control device 20.

In this way, only after switching over the states of the two control lines in a predetermined sequence and at predetermined timing, the sub-control device 30 is allowed to make an interruption; therefore, if the sub-control device 30 is not in a normal state, an interruption by the sub-control device 30 is blocked. Now, by varying the switching time, that is, the first switching timing of 50 msec. and the next switching timing of 100 msec., influence of periodic noise can be avoided. Also, because the timer counts in units of several tens of msec., malfunction due to spike noise (instantaneous and strong pulsive noise) is prevented.

Execution of the deviation preventing program 321 by the sub-control device 30 has a significant effect on a flight of the multicopter 90, such as invalidation of the body control by the main control device 20 and a fall of the body. Hence, it is necessary to prevent that the body control by the main control device 20 is unjustly deprived due to runaway of the sub-control device 30. Because the flight controller FC in the present embodiment is equipped with the runaway detecting program 41, it is possible to prevent unintended execution of the deviation preventing program 321 due to runaway of the sub-control device 30.

Now, in the present embodiment, the sub-control device executes all the deviation preventing manipulations after interrupting a control processing by the main control device 20; however, the device that executes the deviation preventing manipulation is not necessarily the sub-control device 30. For example, a configuration may be such that functions of the deviation preventing program 321 and data of flight area information 32 are shared with the main control device 20 and the main control device 20 executes manipulations except for the landing and fall manipulations of the multicopter 90, as instructed from the sub-control device 30, without occurrence of an interruption by the sub-control device 30.

Second Embodiment

[Configuration Overview]

Figure 4:
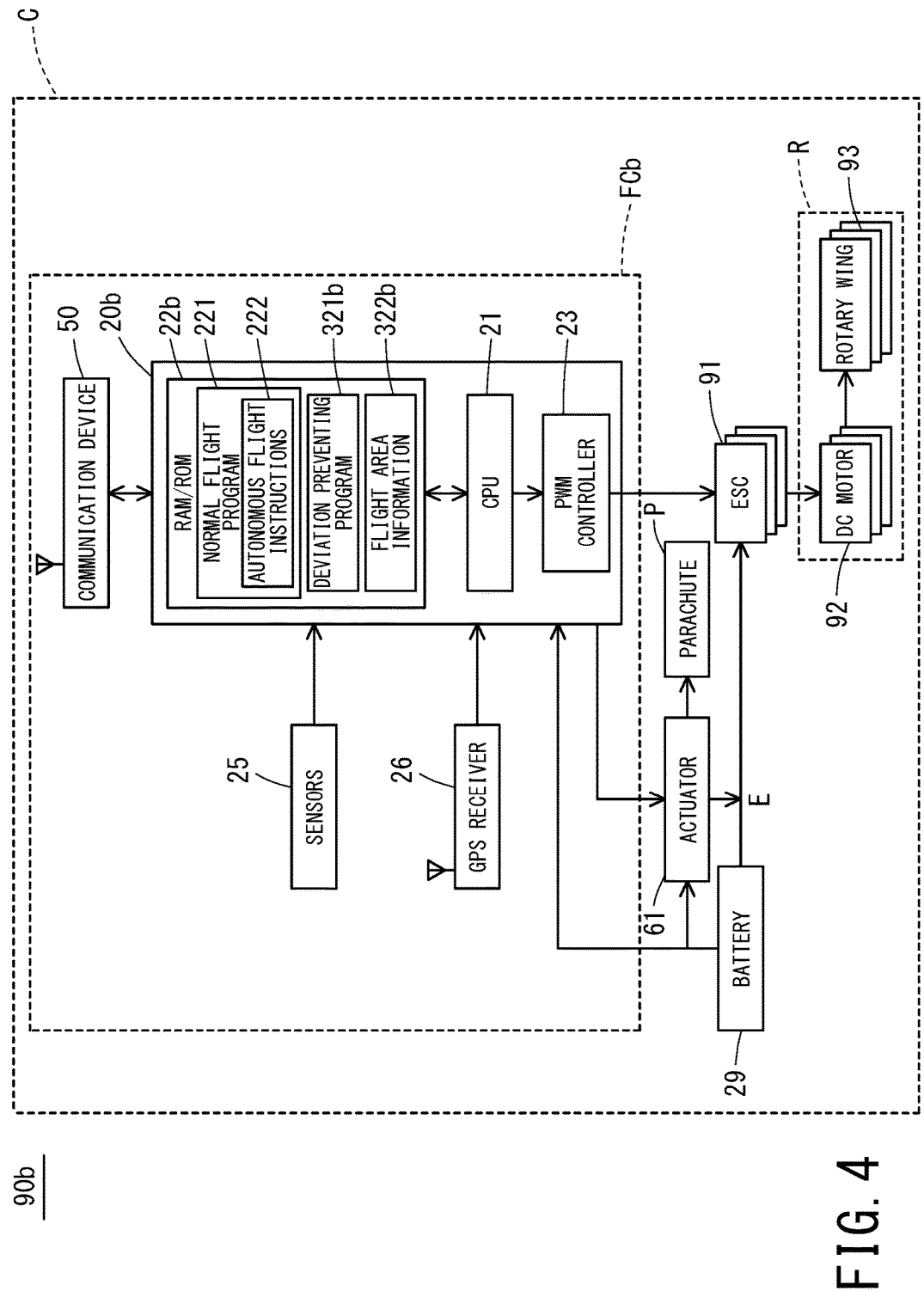
FIG. 4 is a block diagram depicting a general configuration of a multicopter pertaining to a second embodiment.
Figure 5:
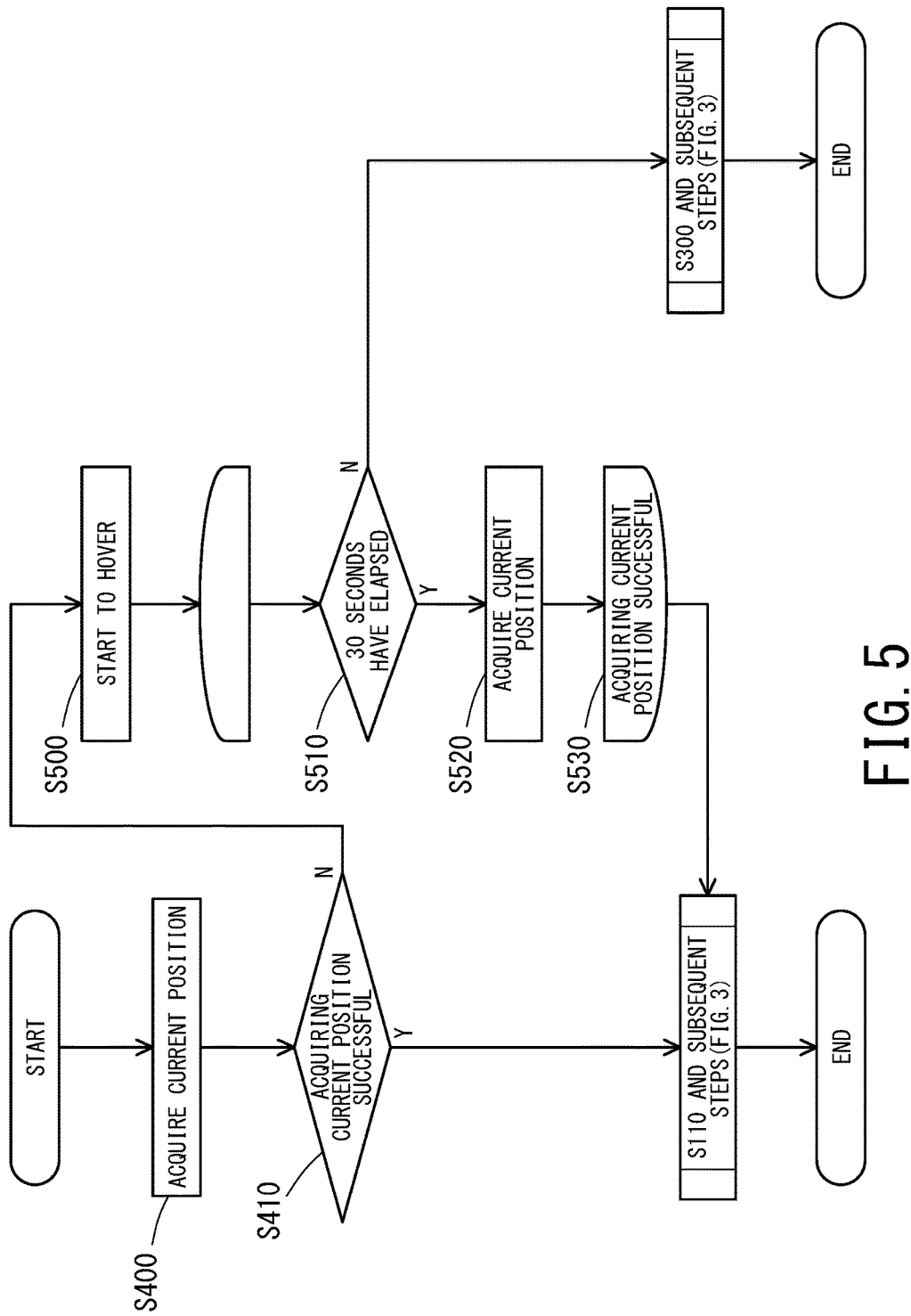
FIG. 5 is a flowchart illustrating deviation preventing manipulations by the deviation preventing means in the second embodiment.

In the following, with the aid of the drawings, descriptions are provided about a second embodiment of the flight control apparatus and the unmanned aerial vehicle equipped with the same pertaining to the present invention. FIG. 4 is a block diagram depicting a functional configuration of a multicopter 90b (an unmanned aerial vehicle) pertaining to the present embodiment. FIG. 5 is a flowchart illustrating conditions for execution of deviation preventing manipulations by a deviation preventing program 321b (deviation preventing means) in the multicopter 90b. Now, in the following description, a component having the same function as in the foregoing embodiment is assigned the same reference designator as in the foregoing embodiment and its detailed description is omitted. Also, a component having basic functions in common with the corresponding one in the foregoing embodiment is assigned the reference designator suffixed with b of the corresponding one in the foregoing embodiment and description about the basic functions is omitted.

The multicopter 90b of the present embodiment has a configuration such that the sub-control device 30 and the suite of sensors 35, the GPS receiver 36, and the battery 39 which are attached to the sub-control device 30 are removed from the hardware configuration of the multicopter 90 of the first embodiment. Because the sub-control device 30 is removed, a control signal that is sent from the CPU 21 to the PWM controller 23 is not diverted to the interruption circuit 40 and the control signal is sent from the CPU 21 directly to the PWM controller 23. In addition, the deviation preventing program 321 and flight area information 322 held in the sub-control device 30 in the first embodiment are registered in the ROM/RAM 22b (flight area storing means) of the main control device 20b. For the deviation preventing program 321b in the main control device 20b, its priority is set higher than the normal flight program 221. In the multicopter 90b, the deviation preventing program 321b is executed preferentially to the normal flight program 221.

Additionally, the multicopter 90b is equipped with an actuator 61 which spreads a parachute P and mechanically pulls out a feed line (power line) E to the ESC 91 from the battery 29. The actuator 61 is connected to the main control device 20b and is activated by an instruction to execute a fall manipulation ((5) a fall manipulation of the body) from the deviation preventing program 321b. Here, the parachute P suspends the body of the multicopter 90b being tilted approximately 90 degrees in a vertical direction from a hovering attitude of the body. That is, it suspends the body of the multicopter 90b so that the arm supporting the rotors R will first land on the ground. Thereby, for instance, even when the multicopter supports expensive equipment in its bottom part, the body of the multicopter 90*b* can serve as a cushion upon its fall and damage to the equipment can be reduced.

[Deviation Preventing Manipulations]

A flow of deviation preventing manipulations of the multicopter 90*b* by the deviation preventing program 321*b* is described below. The flight controller FCb executes the deviation preventing program 321*b* periodically. The multicopter 90*b* in the present embodiment acquires a flight position (hereinafter also referred to as the current position) of the multicopter 90*b* in the air, using the suite of sensors 25 and the GPS receiver 26 of the main control device 20*b* (S400).

If acquiring the current position at S400 is successful (S410: Y), then, S110 and subsequent processing steps in the flowchart illustrated in FIG. 3 are executed. If acquiring the current position has failed because of, e.g., radio disturbance, failure of the GPS receiver 26, or for other reason (S410: N), the deviation preventing program 321*b* causes the multicopter 90*b* to hover there ((3) hovering or a circular flight of the body) (S500).

The multicopter 90*b* that started to hover at S500 retries to acquire the current position while continuing to hover (S520). If acquiring the current position has succeeded (S530) within 30 seconds (S510: N), S110 and subsequent processing steps in the flowchart illustrated in FIG. 3 are executed. If the multicopter cannot acquire the current position even upon the elapse of 30 seconds from the start of hovering (S510: Y), S300 and subsequent processing steps in the flowchart illustrated in FIG. 3 are executed.

If acquiring the current position within 30 seconds is not successful, the deviation preventing program 321*b* attempts a landing manipulation of the multicopter 90*b* ((4) a landing manipulation of the body) (S300). When the landing manipulation is successful (S310: Y), the deviation preventing program 321*b* notifies the manipulator of that event (S130) and the process terminates.

When the landing manipulation is not successful (S310: N), the deviation preventing program 321*b* causes the actuator 61 to spread the parachute P and pull out the feed line E to the ESC 91 from the battery 29 and causes the body to fall ((5) a fall manipulation of the body) (S320), and at the same time, notifies the manipulator of that event (S130).

In a case where the multicopter 90*b* has abnormality of the function of acquiring the flight route and the current position and has been placed in a situation where it is impossible to correct its flight position, electronic control of the body will not necessarily function properly. In the present embodiment, a configuration is made such that the deviation preventing program 321*b* causes the actuator 61 to physically break a part of the body (pull out the feed line E), and inevitably, generation of lift is stopped; therefore, it is enabled to cause the body to fall more reliably.

In the present embodiment, a configuration is made such that the actuator 61 executes the body fall manipulation, as instructed from the main control device 20*b* (the deviation preventing program 321*b*); however, how to cause the multicopter 90*b* to fall is not limited to the means in the present embodiment. For example, the actuator 61 may be equipped with a watchdog timer and pull out the feed line E automatically upon the stop of a periodical watchdog manipulation from the main control device 20*b*. Alternatively, a switching element such as FET may be used for breaking a signal line between the PWM controller 23 and the ESC 91. Furthermore, the multicopter 90*b* may be caused to fall by physically separating a part of a lift generating device of the multicopter 90*b*. Now, the "lift generating device" termed in the present invention refers to a necessary structure as a whole for levitating the body of an unmanned aerial vehicle in the air.

As an example, in an instance where the multicopter 90*b* is caused to fall by physically separating the rotors R from the multicopter 90*b*, the rotor R positioned in the rear of the multicopter 90*b* with respect to its flying direction is separated first and the other rotors R are separated after a given period of time. This puts the body in a state where a brake has been applied to it temporarily, so that distance of deviation of the multicopter 90*b* out of the flight area A can be shortened. As another example, in an instance where the multicopter 90*b* is caused to fall by physically separating the battery 29 from the multicopter 90*b*, such a configuration is conceivable that the battery 29 and the body of the multicopter 90*b* are connected with a wire beforehand and the battery 29 will be suspended from the body upon separation of the battery 29. If a protruding object or the like on the ground has pierced through the fallen battery 29, it is feared that a fire happens at a point where the battery 29 has fallen. Such a fire can be obviated by suspending the battery 29 from the body by a wire while separating it, and making the body descend with the parachute.

While embodiments of the present invention have been described hereinbefore, the present invention is not limited to the foregoing embodiments and can be modified in various ways without departing from the gist of the present invention. For example, the unmanned aerial vehicle of the present invention can be applied to not only rotorcrafts, but also fixed-wing unmanned aerial vehicles. In addition, although a deviation preventing manipulation when it is impossible to acquire the flight position and mechanical separation of the lift generating device when a fall manipulation is performed are performed only in the second embodiment, these processing and structure may be added to the first embodiment. Likewise, although the flight controller FCb in the second embodiment is configured to include only the main control device 20*b*, the flight controller may include the sub-control device and the interruption circuit as in the first embodiment.

The invention claimed is:

1. A flight control apparatus that is mounted in a body of an unmanned aerial vehicle, the flight control apparatus comprising a main control device and a sub-control device which are separate entities,
   wherein the main control device includes a central processing unit and a pulse width modulator;
   the central processing unit and the pulse width modulator are connected via the sub-control device; and
   the sub-control device transfers a control signal from the central processing unit to the pulse width modulator to pass therethrough when the body is in a normal flight state, and shuts off a control signal from the central processing unit and sends a control signal directly to the pulse width modulator when interrupting a body control processing by the main control device.

2. The flight control apparatus according to claim 1, further comprising runaway detecting means which is a circuit to shut off an unjust interruption by the sub-control device,
   wherein the sub-control device cannot interrupt the body control processing by the main control device unless after executing predefined processing to the runaway detecting means.

3. The flight control apparatus according to claim 2,
   wherein the runaway detecting means includes a sequential circuit; and the sub-control device is allowed to interrupt the body control processing by the main control device by switching over outputs of the sequential circuit in a predetermined sequence and at predetermined timing.

4. The flight control apparatus according to claim 1, wherein the main control device and the sub-control device include separate ones of current position acquiring means for acquiring a flight position of the body in the air, respectively, and are connected to separate sources of power supply.

5. The flight control apparatus according to claim 1, comprising:
   flight control means for controlling attitude and flying operations of the body when the unmanned aerial vehicle is in a normal flight state;
   current position acquiring means for acquiring a flight position of the body in the air;
   flight area storing means in which information that delimits a flight area which is a space in which the body is permitted to fly is registered; and
   deviation preventing means for preventing the body from deviating from the flight area,
   wherein the main control device comprises the flight control means;
   the sub-control device includes the flight area storing means and the deviation preventing means; and
   the deviation preventing means forcibly makes the body unable to fly, based on predefined conditions.

6. The flight control apparatus according to claim 5, wherein the deviation preventing means causes a parachute to be ejected from the body when forcibly causing the body to fall.

7. The flight control apparatus according to claim 6, wherein the parachute suspends the body tilted approximately 90 degrees in a vertical direction from a hovering attitude of the body.

8. The flight control apparatus according to claim 5, wherein the deviation preventing means electrically or mechanically breaks a signal line or a power line which is constituent of a lift generating device of the body or physically separates at least a part of the lift generating device from the body when forcibly causing the body to fall.

9. An unmanned aerial vehicle comprising:
   the flight control apparatus as described in claim 5; and
   a plurality of rotors comprising a plurality of DC motors and rotary wings installed on respective output shafts of the DC motors.

10. The unmanned aerial vehicle according to claim 9, wherein, when the body has descended to a predetermined altitude of 3 m or below from the ground, the deviation preventing means stops rotation of the plurality of rotors to cause the body to fall, when forcibly causing the body to land.

11. The unmanned aerial vehicle according to claim 9, wherein the deviation preventing means first separates the rotor positioned in the rear of the body with respect to its flying direction and separates the other rotors after a given period of time when forcibly causing the body to fall.

* * * * *